US012347948B2

(12) United States Patent
Ogurtsov et al.

(10) Patent No.: US 12,347,948 B2
(45) Date of Patent: Jul. 1, 2025

(54) ANTENNA DEVICE SUITABLE FOR WIRELESS COMMUNICATIONS, AND A RF TRANSCEIVER CONTAINING SUCH AN ANTENNA DEVICE

(71) Applicant: THE ANTENNA COMPANY INTERNATIONAL N.V., Willemstad (CW)

(72) Inventors: Stanislav Ogurtsov, Eindhoven (NL); Diego Caratelli, Eersel (NL); Javier Armando Arrincon Rodriguez, Eindhoven (NL); Guilherme Theis, Eindhoven (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 180 days.

(21) Appl. No.: 18/219,290

(22) Filed: Jul. 7, 2023

(65) Prior Publication Data

US 2024/0072448 A1 Feb. 29, 2024

(30) Foreign Application Priority Data

Aug. 26, 2022 (NL) ...................................... 2032863

(51) Int. Cl.
*H01Q 9/04* (2006.01)
*H01Q 21/06* (2006.01)

(52) U.S. Cl.
CPC ......... *H01Q 9/0485* (2013.01); *H01Q 21/065* (2013.01)

(58) Field of Classification Search
CPC .. H01Q 9/0485; H01Q 21/065; H01Q 21/061; H01Q 1/02
See application file for complete search history.

(56) References Cited

U.S. PATENT DOCUMENTS

2014/0043189 A1* 2/2014 Lee ...................... H01Q 9/0485 342/368
2022/0359993 A1* 11/2022 Caratelli .............. H01Q 21/061

OTHER PUBLICATIONS

Stanislav, et al.; "A Novel Class of Dielectric Resonator Antenna Phased Arrays with Enhanced Beam-Scanning Capabilities for mm-Wave Applications"; The Antenna Company B.V., 5656 AE Eindhoven, The Netherlands; Eindhoven University of Technology, 5600 MB Eindhoven, The Netherlands.

* cited by examiner

*Primary Examiner* — David E Lotter
(74) *Attorney, Agent, or Firm* — Nath, Goldberg & Meyer; Joshua B. Goldberg

(57) ABSTRACT

Antenna device that is configured to perform wide angle two-dimensional scanning, and which is suitable for wireless communication protocols, wherein the antenna device comprises:
i) a primary plate containing a multitude of adjacent antenna units, wherein each antenna unit is provided with a respective electrically conductive antenna patch which is provided at a top side of the primary plate, and
ii) a dielectric resonator section which is arranged above the primary plate, which dielectric resonator section comprises a multitude of adjacent resonator units which are either directly or indirectly attached to the top side of the primary plate, in such a way that an individual resonator unit is arranged above each individual antenna unit.

27 Claims, 3 Drawing Sheets

ANTENNA DEVICE SUITABLE FOR WIRELESS COMMUNICATIONS, AND A RF TRANSCEIVER CONTAINING SUCH AN ANTENNA DEVICE

The present invention relates to an antenna device that is configured to perform wide angle two-dimensional scanning, and which is suitable for wireless communication protocols. The invention is particularly suitable for wireless communication protocols according to a 5G and 6G network standard. In accordance therewith, the invention is generally useful in wireless communications wherein millimeter or sub-millimeter wave frequency bands are used. Furthermore, the invention may be used in remote sensing and space/satellite applications.

In the context of antennas which are useful for 5G and 6G applications, it is a prerequisite that the antenna has a relatively broad field of view in regard of emitting and receiving electromagnetic waves, and in particular is configured to perform a so-called wide angle two-dimensional scanning.

In order to achieve that objective, an antenna device has been developed in the prior art, which is an antenna device that is configured to perform wide angle two-dimensional scanning, and which is suitable for wireless communication protocols, wherein the antenna device comprises:

i) a primary plate containing a multitude of adjacent antenna units, wherein each antenna unit is provided with a respective electrically conductive antenna patch which is provided at a top side of the primary plate, and ii) a dielectric resonator section which is arranged above the primary plate, which dielectric resonator section comprises a multitude of adjacent resonator units which are either directly or indirectly attached to the top side of the primary plate, in such a way that an individual resonator unit is arranged above each individual antenna unit, wherein the resonator units are made of dielectric material, and each resonator unit comprises a stud that protrudes in an upward direction from the primary plate, and the studs of the resonator units are dimensioned such that the studs are laterally spaced apart from each other.

In the technological field, such an antenna device is commonly referred to as a dielectric resonator antenna, or its acronym DRA.

In a DRA, the number of antenna units is typically 32 up to 256, and in particular 64 up to 128. Furthermore, it is common that the adjacent antenna units are positioned in a number of parallel arrays according to a grid-like pattern.

The grid of antenna units is capable of creating a broad field of view, when a phase difference is applied over the respective input signals that are led to the individual patch antenna units. It is herein beneficial that the distance between the central points of adjacent patches is approximately half the value of the wavelength that is to be emitted.

In order to achieve a highly effective DRA, a dielectric resonator unit is arranged above each antenna unit for achieving an adequate transmission of electromagnetic signals for its intended use.

An important issue when operating such an antenna device which includes multiple adjacent antenna units and resonator units, is to avoid any overheating of the antenna device during operation, which would be detrimental to a proper functioning of the antenna device.

Especially in view of the number of antenna units that are typically included in the DRA antenna device, a significant amount of heat is produced during operation which should be adequately exchanged with the environment to avoid overheating of the device.

A property that is commonly used to express the aptitude of a system for exchanging heat, is its thermal conductivity, i.e. the capability of a system to conduct a heat flow over a temperature difference that is subjected to the system. The thermal conductivity essentially determines what reduction of temperature can be achieved by heat exchange with its environment when the antenna is operational.

In order to achieve a sufficient heat exchange with the environment, a commonly applied solution is to provide the antenna device with passive heat sinks in order to secure that the heat produced by the antenna device is sufficiently exchanged with surrounding air. The heat sinks herein raise the overall thermal conductivity of the device to such an extent that the overall temperature of the device during operation can be kept at a significantly lower level.

However, it has been found that the inclusion of such passive heat sinks may not be sufficient in several cases:

For instance, it has been observed that in an antenna device having a number of antenna units of 64 or more, the thermal conductivity of the system provided with passive heat sinks is insufficient to secure that overheating is avoided during operation of the device.

Furthermore, an antenna device with passive heat sinks could also be found to achieve an inadequate heat exchange with the environment, when considering that the device is to be used under various climatic and topographic circumstances which may negatively affect a proper heat exchange with the environment.

In view of the above drawbacks of the antenna devices known from the prior art, it is an objective of the invention to provide an antenna device which achieves an improved exchange of heat with the environment in comparison to the prior art.

In order to achieve the above objective, the invention provides an antenna device of the above indicated type, wherein the antenna device additionally contains:

iii) a grate layer comprised of a planar metallic sheet perforated by a multitude of adjacent grate holes, wherein the grate layer is attached directly or indirectly to the top side of the primary plate and in a parallel orientation thereto, and the grate layer is configured such that a grate hole is positioned above each antenna unit, and each grate hole is dimensioned such that the stud of the resonator unit that is arranged above each antenna unit, fits within the respective grate hole.

It has been found that such an antenna device while being capable of wide angle 2D scanning and suitable for wireless communication by virtue of features i) and ii), additionally has improved thermal characteristics for heat dissipation by virtue of the grate layer according to feature iii). The grate layer is not only metallic, but furthermore surrounds each individual stud of a resonator unit, so that the exchange of heat from the antenna device towards the grate layer as well as towards the environment is significantly raised by inclusion of the grate layer. Consequently, the risk of overheating of the antenna device during operation is further reduced.

It is attractive in the antenna device according to the invention, that the total number of adjacent antenna units is in the range of 32 to 256, preferably 64 to 128.

Such a number of antenna units is highly suitable to perform a wide angle two-dimensional scanning, and consequently creating a broad field of view.

For the same above reasons, it is attractive for the antenna device according to the invention, that the multitude of adjacent antenna units of the primary plate are positioned in a regular pattern such as a grid (e.g. a grid of linear arrays).

Alternatively, the adjacent antenna units of the primary plate may be positioned in an irregular pattern.

Furthermore, the following individually preferred features are included In the antenna device according to the invention:

- the metallic sheet of the grate layer has a thermal conductivity of 100 W/(K·m), preferably 200 W/(K·m) or higher;
- the metallic sheet of the grate layer is substantially made from aluminum;
- the metallic sheet of the grate layer has a thickness in the range of 0.50 mm to 3.0 mm, preferably of 0.70 to 2.0 mm, more preferably of 0.90 to 1.6 mm.

These preferred features with respect to the metallic sheet are highly effective in achieving a sufficient heat dissipation from the antenna device towards the environment.

It is further preferred in the antenna device according to the invention, that each stud fits within its respective grate hole without contacting the metallic sheet of the grate layer that delimits the respective grate hole.

In such an embodiment, a gap is present between the stud and the grate layer that immediately surrounds the stud. This gap thus allows for heat dissipation based on heat exchange with surrounding air of the environment in addition to the heat dissipation by virtue of the grate layer itself.

With respect to the grate holes of the grate layer that is included in the antenna device according to the invention, the following individually preferred features are pointed out:

- the grate holes are provided as bores extending through the metallic sheet, preferably extending perpendicular to the metallic sheet;
- each grate hole has a widening end (flaring) at a top side of the grate hole.
- each grate hole has a minimum width in the range of 3.0 to 5.0 mm.

With respect to the grate holes being provided as bores the following is noted:

- the bores may be cylindrical bores;
- each grate hole may be a combination of an upper bore and a lower bore that are connected to each other, wherein preferably the upper bore has a smaller diameter than the lower bore;
- when an upper bore and lower bore are included, the upper bore may be provided with a widening end.

In the antenna device according to the invention, each grate hole is delimited by a respective inner surface of the grate layer, which inner surface is preferably:

- an even surface, or
- a non-even surface, such as a surface provided with a relief structure.

In respect of the invention, it is further preferred that each grate hole, viewed in a cross-section perpendicular to the planar metallic sheet,

- either has a cross-sectional contour which is rounded,
- or has a cross-sectional contour which is generally defined by an x and y coordinate which fulfils the following equations:

$$x(\phi)=c_x R(\phi)\cos(\phi)$$

$$y(\phi)=c_y R(\phi)\sin(\phi)$$

wherein:

$$R(\phi)=\left[\left|\frac{\cos\left(\frac{m_1\phi}{4}\right)}{a_1}\right|^{n_1}+\left|\frac{\sin\left(\frac{m_2\phi}{4}\right)}{a_2}\right|^{n_2}\right]^{-\frac{1}{b_1}}$$

wherein the values for the parameters $c_x$, $c_y$, $m_1$, $m_2$, $a_1$, $a_2$, $n_1$, $n_2$ and $b_1$ are selected from the group of real numbers of positive value, and $\varphi$ is an angular coordinate that covers the range from $-\pi$ to $\pi$;

which contour includes the shapes of an oval, an ellipse, a circle, or a variant thereof.

It is preferable in the context of the invention, that the adjacent resonator units are laterally spaced apart from each other by a surrounding gap, and the grate layer is dimensioned such that it extends into the surrounding gaps between adjacent resonator units.

Such a configuration of the resonator units further contributes to optimizing the heat exchange for each antenna unit and respective resonator unit, as the grate layer is not merely present between the studs of the resonator units, but between the resonator units as a whole.

With respect to the resonator units included in the antenna device according to the invention, it is preferred that a number of the resonator units, or all the resonator units, are dimensioned such that:

- i) the stud sticks out above a top side of the grate hole, wherein preferably 20% to 50% of the total height of the stud sticks out, or
- ii) the stud does not stick out above a top side of the grate hole.

Furthermore, with respect to the resonator units included in the antenna device according to the invention, the following individually preferred features apply:

- each stud has a height that is similar to, or smaller than its maximum width, preferably the height of each stud is in the range of 40% to 60% of its maximum width;
- the height of each resonator unit is in the range of 0.50 mm to 4.0 mm, preferably in the range of 0.80 mm to 3.0 mm, and the maximum width of the resonator unit is in the range of 4.0 to 5.0 mm;
- each resonator unit comprises a resonator base which is connected to a bottom side of the stud, wherein preferably the resonator base has a larger width than the stud, more preferably the maximum width of the stud being 20% to 40% smaller than the maximum width of the resonator base;
- the outer circumference of the stud tapers in the projecting direction of the stud, and preferably the cross-sectional contour of each stud is substantially of the same form along its projecting direction.

For instance, the outer shape of the stud of the resonator unit may have the form of a cone, or of a dome. Alternatively, the outer shape may be cylindrical.

In the antenna device according to the invention, it is furthermore preferred that each stud, viewed in a cross-section perpendicular to its projecting direction,

- either has a cross-sectional contour that is rounded,
- or has a cross-sectional contour which is generally defined by an x and y coordinate which fulfils the following equations:

$$x(\phi)=c_x R(\phi)\cos(\phi)$$

$$y(\phi)=c_y R(\phi)\sin(\phi)$$

wherein:

$$R(\phi) = \left[\left|\frac{\cos\left(\frac{m_1\phi}{4}\right)}{a_1}\right|^{n_1} + \left|\frac{\sin\left(\frac{m_2\phi}{4}\right)}{a_2}\right|^{n_2}\right]^{-\frac{1}{b_1}}$$

wherein the values for the parameters $c_x$, $c_y$, $m_1$, $m_2$, $a_1$, $a_2$, $n_1$, $n_2$ and $b_1$ are selected from the group of real numbers of positive value, and φ is an angular coordinate that covers the range from −π to π;

which contour includes the shapes of an oval, an ellipse, a circle, or a variant thereof.

In a particularly preferred embodiment of the antenna device according to the invention, the adjacent resonator units are attached onto the corresponding adjacent antenna units by an intermediate layer which extends over the top side of the primary plate, which intermediate layer is either a homogeneous layer made from dielectric material or a composite layer containing a multitude of adjacent sections of dielectric material which sections are separated from each other.

With regard to the intermediate layer being a composite layer, it is noted that the adjacent sections of dielectric material are preferably positioned such that each separate section herein functions as an attachment layer which attaches an antenna unit to a corresponding resonator unit present above the antenna unit.

Optionally, such an intermediate layer preferably has adhesive properties on its top and/or bottom surface, in order to attach respectively to the resonator unit and to the antenna unit.

Furthermore, it is preferred that the intermediate layer has a thickness of 1.00 mm or less, preferably a thickness of 0.35 up to 0.65 mm. The intermediate layer thus has the dimensions of a foil layer.

In regard of the resonator units included in the antenna device according to one the invention, the following individually preferred features apply:

- the resonator units have a relative permittivity in the range of 5-20, preferably in the range of 8-14, more preferably 10;
- the resonator units have a loss tangent smaller than 0.0002 in the frequency band of operation;
- the resonator units are made from a dielectric material which the has a thermal conductivity of at least 10 W/(m·K), in particular at least 20 W/(m·K);
- the resonator units are substantially made from alumina (i.e. $Al_2O_3$).

In regard of the antenna units included in the primary plate of the antenna device according to the invention, it is preferred that the antenna patch of each antenna unit is provided with an aperture or slot, preferably at a central position in the antenna patch.

Furthermore, it is preferred in the antenna device of the invention, that each antenna unit has

- a respective feed connector for an electrical input signal, which feed connector is present at a bottom side of the primary plate and is connected by electrically conductive vias to the respective antenna patch, and
- a respective electrically conductive strip line which is present inside the primary plate and which is electrically isolated from the antenna patch and the conductive vias by a respective dielectric spacer structure.

Typically, the primary plate is a printed circuit board which is composed from layers of a dielectric substrate onto which electrically conductive structures are printed thus forming the components for each antenna unit.

The components of each antenna unit are such that the antenna unit is operable in a frequency band between 5 GHz and 100 GHz, or in any millimeter or sub-millimeter wave frequency range.

A practically preferred embodiment of the invention, is a RF transceiver of a wireless communications device which comprises at least one antenna device according to the invention.

The invention will be further elucidated with reference to the accompanying FIGS. which show preferred embodiments of the invention, wherein.

Figure 4:
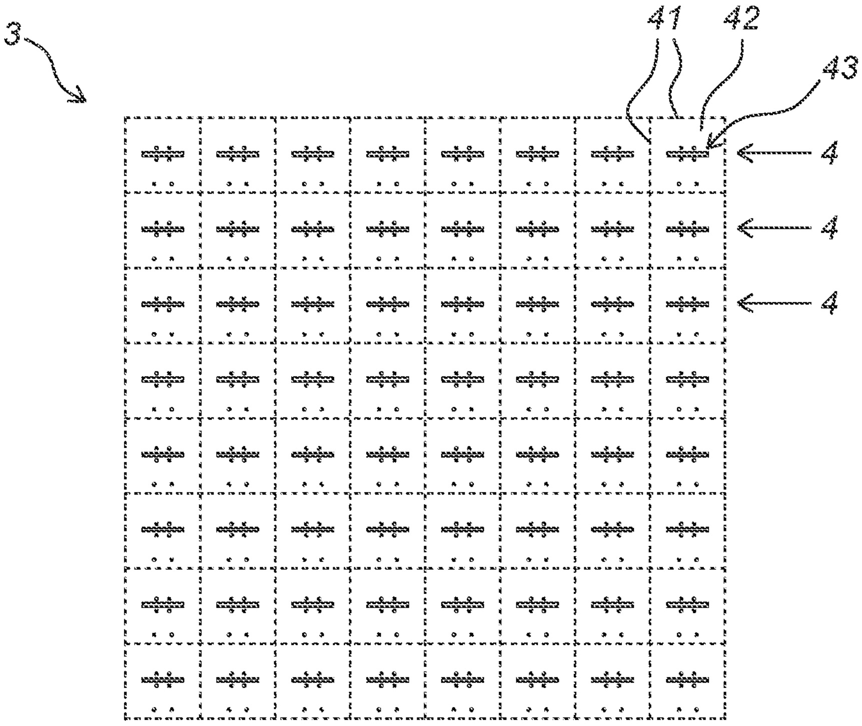
FIG. 4 shows a top view of a structural element of the antenna device shown in FIG. 1.
Figure 5:
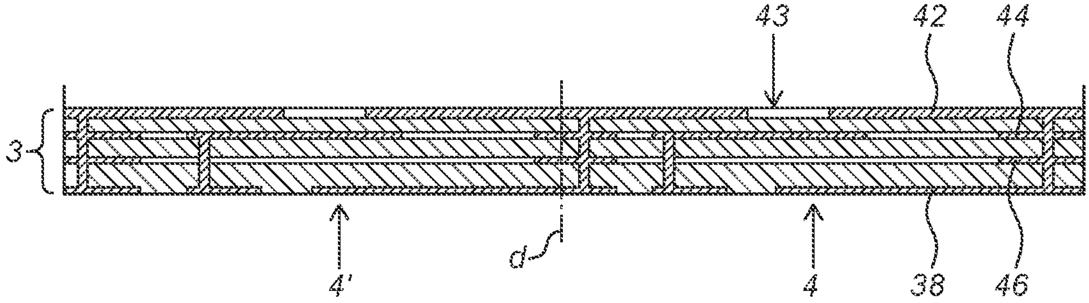

FIG. 5 a cross-sectional view of a part of the structural element shown in FIG. 4.

Figure 1:
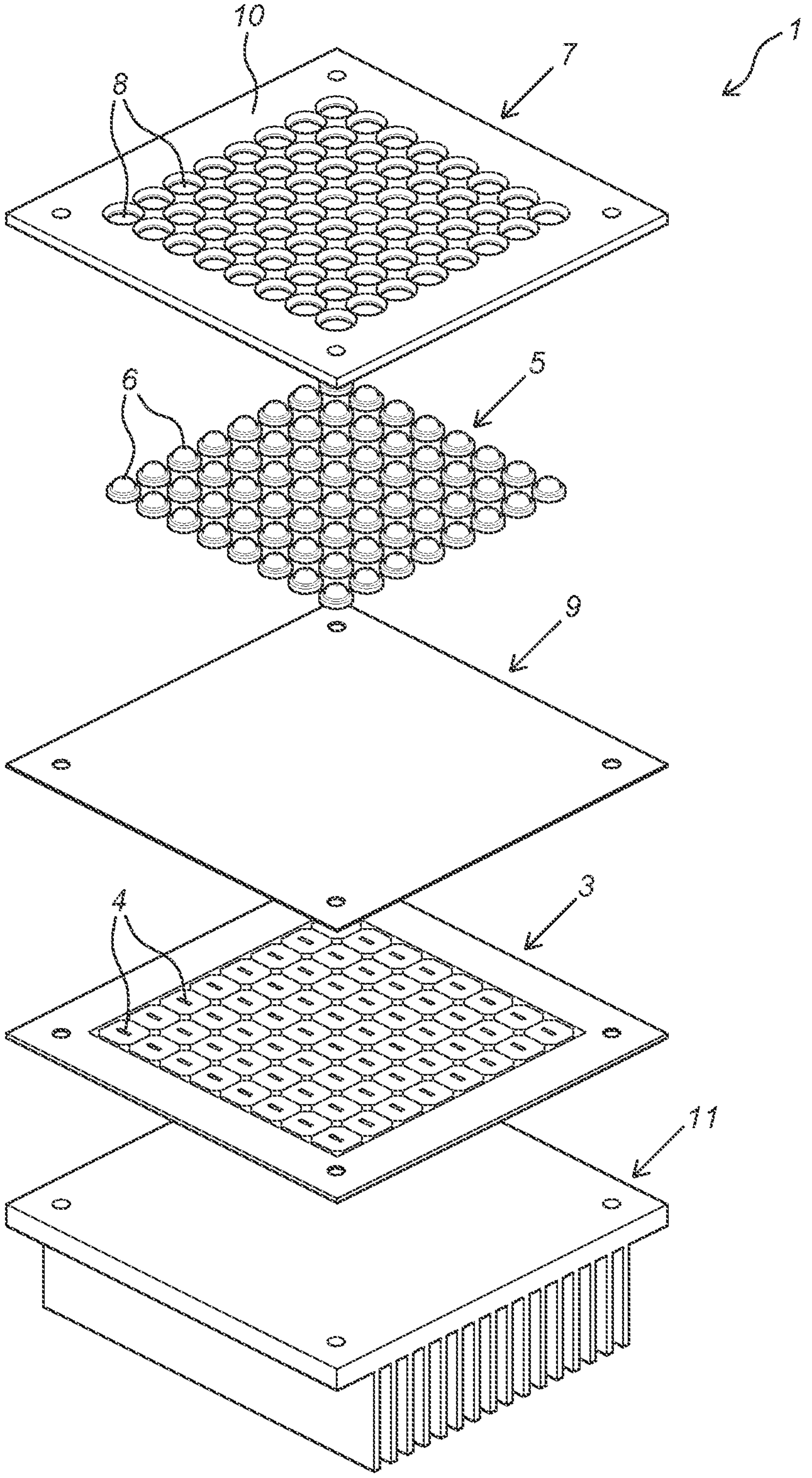
FIG. 1 shows an exploded view of structural elements of an antenna device according to the invention.

FIG. 1 shows an exploded view of an antenna device 1, which comprises a primary plate 3 containing a multitude of adjacent antenna units 4, wherein each antenna unit is provided with a respective electrically conductive antenna patch which is provided at a top side of the primary plate 3, as will be shown in more detail in FIG. 4.

A dielectric resonator section 5 made from alumina ($Al_2O_3$) is arranged above the primary plate 3, which dielectric resonator section 5 comprises a multitude of adjacent resonator units 6 which are attached to the top side of the primary plate 3, and in such a way that an individual resonator unit is arranged above each individual antenna unit. The dielectric constant of the dielectric resonator section 5 is about 9.9. Each resonator unit 6 comprises a stud that protrudes in an upward direction from the primary plate 3, and the studs of the resonator units 6 are dimensioned such that the studs are laterally spaced apart from each other. The studs of the resonator units are further elucidated in more detail in FIG. 3.

Between the primary plate 3 and dielectric resonator section 5, an intermediate layer 9 is present as a uniform dielectric foil layer having an adhesive top and bottom surface. The intermediate layer 9 is optional within the context of the invention, and can be dispensed with such that primary plate 3 and resonator section 5 are directly attached to each other instead of via intermediate layer 9.

On the top side of the antenna device 1, a grate layer 7 is provided which is comprised of a planar metallic sheet 10 from aluminum which is perforated by a multitude of adjacent grate holes 8. The grate layer 7 is attached directly or indirectly to the top side of the primary plate 3 and in a parallel orientation thereto, and the grate layer 7 is configured such that a grate hole 8 is positioned above each antenna unit 4, and each grate hole 8 is dimensioned such that the stud of the resonator unit 6 that is arranged above each antenna unit 4, fits within the respective grate hole 8. This specific configuration will be further elucidated in more detail in FIGS. 2 and 3.

A heat sink device 11 is provided on the bottom side of the antenna device, directly below the primary plate 3. The heat sink device 11 is optional within the context of the invention, and can be dispensed with dependent on the requirements imposed on the antenna device 1.

The antenna device is suitable to be used in the range of 24 GHz, and a wavelength of 12.4 mm.

Figure 2:
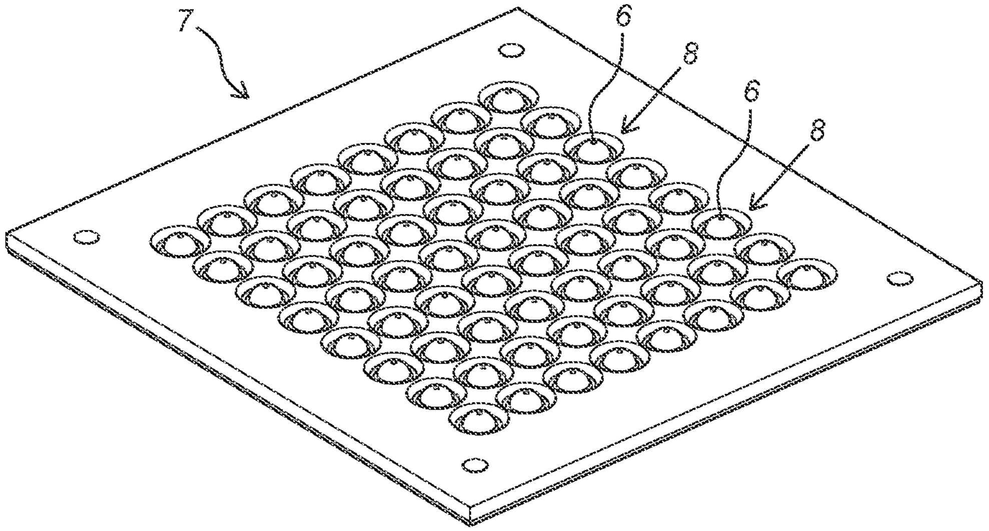
FIG. 2 shows an assembled state of structural elements of the antenna device shown in FIG. 1.

FIG. 2 shows an assembled state of the grate layer 7 and the dielectric resonator section 5 which were separately shown in FIG. 1. The two structural parts are dimensioned in such a way that each resonator unit 6 fits within a respective grate hole 8 when the two structural elements are assembled.

Figure 3:
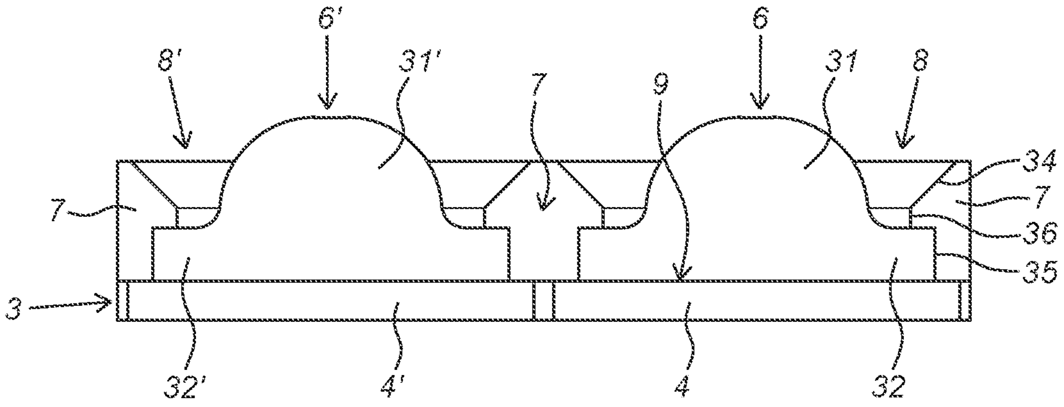
FIG. 3 shows a cross-sectional view of a detail of an assembled state of structural elements of the antenna device shown in FIG. 1.

FIG. 3 shows a detail of an assembled state of the grate layer 7, the dielectric resonator section 5, the intermediate layer 9 and primary plate 3, as shown in FIG. 1, in respect of two adjacent antenna units 4 and 4' and the configuration of the additional structures that are directly present above these units. Structures which are already shown in FIG. 1, are indicated by the same reference numbers. The adjacent resonator units 6 and 6' are herein composed of a stud 31 resp. 31' and a resonator base 32 resp. 32'. The studs 31 and 31' are dimensioned to protrude in an upward direction from the primary plate 3. Typically both the stud 31 and the resonator base 32 have a circular shape in the horizontal plane. A suitable height of the whole resonator unit 6 is about 2.1 mm, while the height of the stud 31 is about 1.4 mm, and the height of the resonator base 32 is about 0.7 mm. The outer width (diameter) of the resonator base is about 4.5 mm, and the maximum outer width of the stud 32 is about 3.2 mm, which gradually tapers in upward vertical direction so that the outer surface of the stud 32 is formed like a dome.

Typically, the distance between centers of adjacent studs 6 and 6' is about 5.5 mm. This distance applies to all adjacent studs 6 within the entire resonator structure 5 shown in FIG. 1. Obviously, the same distance is adhered to with respect to the distance between centers of adjacent antenna units 4 and 4'.

The intermediate layer 9 is a uniform dielectric foil layer having a thickness in the range of 0.35 mm up to 0.65 mm.

As shown, the adjacent studs 31 and 31' and the resonator bases 32 and 32' are laterally spaced apart from each other, and the grate layer 7 is dimensioned such that it extends in between the adjacent studs 31 and resonator bases 32. For that reason, the outer maximum circumference of the stud 31 and the base 32 is slightly smaller than the width of the each grate hole 8 at the corresponding height.

The two adjacent grate holes 8 and 8' in the grate layer 7 are each formed by a lower cylindrical bore 35 and an upper cylindrical bore 36 which is additionally provided with a widening end 34. Typically, the minimum width of the grate hole is 4.0 mm, and the maximum width at the widening end is 5.2 mm. A suitable thickness of the grate layer 7 is 1.4 mm.

FIG. 4 shows a top view of the primary plate 3 which contains 64 adjacent antenna units 4 which are positioned in a grid of 8 parallel rows of 8 antenna units. The top layer of each antenna unit 4 is composed of an electrically conductive antenna patch 42 which is provided with a longitudinal slot 43 and which is surrounded by an outer boundary 41.

FIG. 5 shows a cross-section of a part of the primary plate 3 shown in FIG. 4, which is a printed circuit board which is composed of layers of a dielectric substrate onto which electrically conductive structures are printed.

Two adjacent antenna units 4 and 4' are shown, which are electrically separated from each other by boundaries 41 at the dotted line d.

Each antenna unit 4 and 4' contains:

A bottom layer 38 containing a feed connector for an electrical input signal, which feed connector is connected by electrically conductive vias to the respective antenna patch 42 on the top side of the antenna unit; at the top side, an antenna patch 42 which is provided with a longitudinal rectangular slot 43;

An intermediate layer 44 containing a distributed impedance matching network printed on a dielectric layer through which the conductive vias are led.

A further intermediate layer 46 containing an electrically conductive strip line or ground plate which is electrically isolated from the antenna patch 42 and the conductive vias by a dielectric layer.

What is claimed is:

1. Antenna device that is configured to perform wide angle two-dimensional scanning, and which is suitable for wireless communication protocols, wherein the antenna device comprises:

i) a primary plate containing a multitude of adjacent antenna units, wherein each antenna unit is provided with a respective electrically conductive antenna patch which is provided at a top side of the primary plate, and ii) a dielectric resonator section which is arranged above the primary plate, which dielectric resonator section comprises a multitude of adjacent resonator units which are either directly or indirectly attached to the top side of the primary plate, in such a way that an individual resonator unit is arranged above each individual antenna unit, wherein the resonator units are made of dielectric material, and each resonator unit comprises a stud that protrudes in an upward direction from the primary plate, and the studs of the resonator units are dimensioned such that the studs are laterally spaced apart from each other, characterized in that the antenna device additionally contains:

iii) a grate layer comprised of a planar metallic sheet perforated by a multitude of adjacent grate holes, wherein the grate layer is attached directly or indirectly to the top side of the primary plate and in a parallel orientation thereto, and the grate layer is configured such that a grate hole is positioned above each antenna unit, and each grate hole is dimensioned such that the stud of the resonator unit that is arranged above each antenna unit, fits within the respective grate hole.

2. Antenna device according to claim 1, wherein the total number of adjacent antenna units is in the range of 32 to 256, preferably 64 to 128.

3. Antenna device according to claim 1, wherein the multitude of adjacent antenna units of the primary plate are positioned in a regular pattern such as a grid, or in an irregular pattern.

4. Antenna device according to claim 1, wherein the metallic sheet of the grate layer has a thermal conductivity of 100 W/(K·m), preferably 200 W/(K·m) or higher.

5. Antenna device according to claim 1, wherein the metallic sheet of the grate layer is substantially made from aluminum.

6. Antenna device according to claim 1, wherein the metallic sheet of the grate layer has a thickness in the range of 0.50 mm to 3.0 mm, preferably of 0.70 to 2.0 mm, more preferably of 0.90 to 1.6 mm.

7. Antenna device according to claim 1, wherein each stud fits within its respective grate hole without contacting the metallic sheet of the grate layer that delimits the respective grate hole.

8. Antenna device according to claim 1, wherein the grate holes are provided as bores extending through the metallic sheet, preferably extending perpendicular to the metallic sheet.

9. Antenna device according to claim 1, wherein each grate hole has a widening end (flaring) at a top side of the grate hole.

10. Antenna device according to claim 1, wherein each grate hole has a minimum width in the range of 3.0 to 5.0 mm.

11. Antenna device according to claim 1, wherein each grate hole, viewed in a cross-section perpendicular to the planar metallic sheet, either has a cross-sectional contour which is rounded, or has a cross-sectional contour which is generally defined by an x and y coordinate which fulfils the following equations:

$$x(\phi)=c_x R(\phi)\cos(\phi)$$

$$y(\phi)=c_y R(\phi)\sin(\phi)$$

wherein:

$$R(\phi)=\left[\left|\frac{\cos\left(\frac{m_1\phi}{4}\right)}{a_1}\right|^{n_1}+\left|\frac{\sin\left(\frac{m_2\phi}{4}\right)}{a_2}\right|^{n_2}\right]^{-\frac{1}{b_1}}$$

wherein the values for the parameters $c_x$, $c_y$, $m_1$, $m_2$, $a_1$, $a_2$, $n_1$, $n_2$ and $b_1$ are selected from the group of real numbers of positive value, and φ is an angular coordinate that covers the range from −π to π;

which contour includes the shapes of an oval, an ellipse, a circle, or a variant thereof.

12. Antenna device according to claim 1, wherein the adjacent resonator units are laterally spaced apart from each other by a surrounding gap, and the grate layer is dimensioned such that it extends into the surrounding gaps between adjacent resonator units.

13. Antenna device according to claim 1, wherein a number of the resonator units, or all the resonator units, are dimensioned such that i) the stud sticks out above a top side of the grate hole, wherein preferably 20% to 50% of the total height of the stud sticks out, or ii) the stud does not stick out above a top side of the grate hole.

14. Antenna device according to claim 1, wherein each stud has a height that is similar to, or smaller than its maximum width, preferably the height of each stud is in the range of 40% to 60% of its maximum width.

15. Antenna device according to claim 1, wherein the height of each resonator unit is in the range of 0.50 mm to 4.0 mm, preferably in the range of 0.80 mm to 3.0 mm, and the maximum width of the resonator unit is in the range of 4.0 to 5.0 mm.

16. Antenna device according to claim 1, wherein each resonator unit comprises a resonator base which is connected to a bottom side of the stud, wherein preferably the resonator base has a larger width than the stud, more preferably the maximum width of the stud being 20% to 40% smaller than the maximum width of the resonator base.

17. Antenna device according to claim 1, wherein the outer circumference of the stud tapers in the projecting direction of the stud, and preferably the cross-sectional contour of each stud is substantially of the same form along its projecting direction.

18. Antenna device according to claim 1, wherein each stud, viewed in a cross-section perpendicular to its projecting direction, has a cross-sectional contour that is rounded, or has a cross-sectional contour which is generally defined by an x and y coordinate which fulfils the following equations:

$$x(\phi)=c_x R(\phi)\cos(\phi)$$

$$y(\phi)=c_y R(\phi)\sin(\phi)$$

wherein:

$$R(\phi)=\left[\left|\frac{\cos\left(\frac{m_1\phi}{4}\right)}{a_1}\right|^{n_1}+\left|\frac{\sin\left(\frac{m_2\phi}{4}\right)}{a_2}\right|^{n_2}\right]^{-\frac{1}{b_1}}$$

wherein the values for the parameters $c_x$, $c_y$, $m_1$, $m_2$, $a_1$, $a_2$, $n_1$, $n_2$ and $b_1$ are selected from the group of real numbers of positive value, and φ is an angular coordinate that covers the range from −π to π;

which contour includes the shapes of an oval, an ellipse, a circle, or a variant thereof.

19. Antenna device according to claim 1, wherein the adjacent resonator units are attached onto the corresponding adjacent antenna units by an intermediate layer which extends over the top side of the primary plate, which intermediate layer is either a homogeneous layer made from dielectric material or a composite layer containing a multitude of adjacent sections of dielectric material which sections are separated from each other.

20. Antenna device according to preceding claim 19, wherein the intermediate layer has adhesive properties on its top and/or bottom surface.

21. Antenna device according to claim 19, wherein the intermediate layer has a thickness of 1.00 mm or less, preferably a thickness of 0.35 up to 0.65 mm.

22. Antenna device according to claim 1, wherein the resonator units have a relative permittivity in the range of 5-20, preferably in the range of 8-14, more preferably 10.

23. Antenna device according to claim 1, wherein the resonator units are made from a dielectric material which the has a thermal conductivity of at least 10 W/(m·K), in particular at least 20 W/(m·K).

24. Antenna device according to claim 1, wherein the resonator units are substantially made from alumina.

25. Antenna device according to claim 1, wherein the antenna patch of each antenna unit is provided with an aperture or slot, preferably at a central position in the antenna patch.

26. Antenna device according to claim 1, wherein each antenna unit has a respective feed connector for an electrical input signal, which feed connector is present at a bottom side of the primary plate and is connected by electrically conductive vias to the respective antenna patch, and a respective electrically conductive strip line which is present inside the primary plate and which is electrically isolated from the antenna patch and the conductive vias by a respective dielectric spacer structure.

27. RF transceiver of a wireless communications device comprising at least one antenna device according to claim 1.

* * * * *